Patented June 26, 1945

2,378,904

UNITED STATES PATENT OFFICE 2,378,904

CATALYSIS

John R. Bates, Swarthmore, Pa., assignor to Houdry Process Corporation, Wilmington, Del., a corporation of Delaware No Drawing. Application May 20, 1941,
Serial No. 394,291

7 Claims. (Cl. 196—52)

The present invention relates to catalysis and has special reference to specific catalysts valuable for promoting organic reactions. In one of its aspects it deals with the transformation of hydrocarbons with the aid of catalysts which selectively promote formation of valuable products from hydrocarbon reactants.

One object of the invention is to promote hydrocarbon reactions, including reactions which produce valuable distillate products. Another object is selectively to promote splitting of hydrocarbon starting material, i. e. scission of carbon-to-carbon linkages of said material to produce lower boiling products. Another object is to produce motor fuels of high anti-knock rating by cracking and/or splitting reactions. Another object is to obtain substantial yields of such motor fuel from ordinarily liquid hydrocarbon oil including hydrocarbon fractions heavier than gasoline, for example, distillate gas oils and distillation residues, and hydrocarbon fractions boiling partially or wholly within the boiling range of gasoline, for example, light and heavy naphthas. Another object is to provide specific catalysts for promoting organic reactions. Other objects will be apparent from the detailed description which follows.

The invention involves subjecting hydrocarbons to decomposition conditions which promote cracking and/or splitting reactions in the presence of catalysts containing composited alumina and zirconia. According to one specific aspect of the invention, ordinarily liquid hydrocarbons including hydrocarbons boiling within or above the boiling range of gasoline are selectively transformed by reactions including splitting reactions to produce valuable distillate products including gasolines and the like. The activity and selectivity of catalysts whose use characterizes certain aspects of the invention are obtained when hydrous alumina and hydrous zirconia produced in aqueous menstruum are composited and the resulting hydrous composite subjected to calcination.

A number of methods of preparing the hydrous composites may be employed. Generally, these methods may be divided into two classes, one involving production or deposition of both hydrous oxides from reactants commingled in a single aqueous menstruum, and the other involving separate production or deposition of the oxides in the same or different aqueous menstruums. Apart from the specific steps or general method employed in formation of the hydrous composite, the latter may consist of hydrogel, gelatinous precipitate, or a mixture or combination of gel or gelatinous precipitate. The whole or part of either one of the hydrous oxides of zirconia and alumina may occur as hydrogel or gelatinous precipitate in a composite containing the other of these oxides in the same or different structural form.

One method of obtaining a composite of the separately produced hydrous oxides is to combine as by mixing, kneading, grinding or the like, suitable proportionate quantities of hydrous zirconia and hydrous alumina separately produced in separate menstruums. To this end, the hydrous zirconia may be prepared by interaction of a solution of a soluble zirconia salt, for example, zirconium nitrate or zirconium sulphate and a solution of a base or of an alkaline salt, for example, ammonium hydroxide, alkali metal hydroxide, or ammonium or an alkali metal carbonate. Hydrous alumina necessary for the succeeding mixing step likewise is preferably made by interaction between solutions of an aluminum salt and of a base or alkaline salt. The desired compositing of the separately produced hydrous oxides may be effected with or without intermediate purification as by washing.

A modification of this method is separately to deposit one of the hydrous oxides from or within an aqueous menstruum and then to deposit the other oxide in its presence as by hydrolysis, precipitation, or setting of a hydrosol. Thus, for example, a hydrogel or gelatinous precipitate of alumina may be mixed, suspended in or saturated with a solution of hydrolysable salt of zirconium, zirconium sulphate, for example, and the resulting hydrous composite heated, if necessary, to accelerate hydrolysis of the zirconium salt. As a variation of this method, which usually produces a minor quantity of hydrous zirconia composited with a major quantity of hydrous alumina, a suitable precipitating agent, for example, ammonium hydroxide or an alkali metal hydroxide may be added to the hydrous alumina precipitate or gel after addition thereto of a solution of zirconium salt.

Conversely, to produce a catalyst containing a major proportion of zirconia and a minor proportion of alumina, hydrous alumina may be hydrolyzed or precipitated from a solution of an alumina salt with which previously prepared hydrous zirconia had been mixed or saturated.

In proceeding according to the preferred method, i. e., production of deposition of the hydrous oxides in a single aqueous menstruum, the composite may be produced by reaction or interaction of separately prepared hydrosols, of solutions of an aluminum salt and a zirconium salt, or of a hydrosol of one oxide and a solution of a salt of the other. Thus, a solution of an aluminum containing salt, for example, aluminum chloride, aluminum sulphate, aluminum nitrate, or an alkali metal aluminate may be mixed with a solution of a zirconium containing salt, for example, zirconium nitrate, zirconium sulphate, or zirconium chloride, under conditions that produce a gel, precipitate, or mixture of gel and precipitate of the mixed hydrous oxides. The resulting concurrent production of the oxides yields composites in which the oxides are intimately associated in highly dispersed form.

Full advantage of intimate and active association is usually obtained when the hydrous oxides are formed in mixtures which are neutral or substantially neutral, or of limited acidity, as for example within the pH range of 3 to 8. To obtain the desired degree of neutrality or acidity it is sometimes desirable to include in the mixture a suitable quantity of acidic or basic material. Thus, to produce desired mixed hydrous oxides from acidic mixtures in which both zirconium and aluminum occur as cations of salts of strong acids, it is preferable to add sufficient quantity of alkali metal hydroxide, ammonium hydroxide, alkali metal carbonate, ammonium carbonate or other suitable soluble basic substance to effect the desired reduction in acidity. Or, when strong alkaline mixtures would result, as is sometimes the case when a solution of alkali metal aluminate is used, the desired adjustment in pH may be obtained by use of acidic materials, for example, hydrochloric or sulphuric acid or a soluble salt of a weak base and a strong acid as illustrated by ammonium chloride and ammonium sulphate.

After calcination the composite of zirconia and alumina is ready for use in promoting the desired hydrocarbon transformations. The calcination step involves subjecting the composite to temperatures sufficiently elevated to drive off most and usually substantially all of its water content. Preferably, calcination temperatures at least as high as those employed in cracking processes are used, as, for example, temperatures within or above the range of 750 to 1050° F.

Although selective catalytic activity in promoting the desired reactions is exhibited by calcined composites containing impurities resulting from the reactions which yield the hydrous oxides, a catalyst of longer life and higher activity is produced when the composite is freed of at least certain of such impurities. Thus, it is preferred that the composite be free or substantially so of soluble salts. To this end, the hydrous oxides or hydrous composite may be washed with water at any desired stage of the catalyst manufacture. If, however, the composite containing soluble salts be dried before washing, preferably at moderate temperature, for example, below 400° F., the washed product has superior and advantageous properties. If desired, the washing step may be followed by calcination at higher temperatures to further develop the desired properties of the catalyst. Removing soluble salts after drying produces a comparatively light contact mass having porous structure and active surface characteristics well adapted for repeated alternate use on stream to promote decomposition and other reactions and in regeneration by combustion to remove coky and other deposits which accumulate on or in the catalyst as a result of those reactions.

Still further improvements in the yield of desired products and longer life of the catalyst are realized when the calcined composite is free or substantially so of alkali metal. In some instances, no special treatment in addition to water washing is necessary to attain substantial freedom from alkali metal. Such is the case when the particular method employed in manufacturing the hydrous composite of alumina and zirconia does not involve the use of an alkali metal compound, as for example an ammonium compound, is utilized as coagulating or precipitating agent. Ammonia which may be thus introduced into the composite is driven off when the composite is calcined at cracking temperature. Also, in following any of the various methods described for production of the hydrous oxides at different times, if an alkali metal compound is employed to promote formation of either one or both of them, a calcined composite substantially free of alkali metal results when the hydrous oxide gel or precipitate so prepared, is washed free of soluble substances before the compositing step. In employing such procedure, however, certain advantages obtained by drying and then washing the composited oxides are sacrificed.

Washing to freedom from soluble substances of composites made by production of the hydrous oxides in the same menstruum or by combining unwashed hydrous oxides, does not produce zirconia and alumina free of impurities. Composites made by these methods are base exchange bodies and hold a certain amount of cation which can be removed only by base exchange, or by volatilization at the selected calcination temperature. To obtain preferred catalysts substantially free of alkali metal from composites containing alkali metal, a base exchange step is employed.

By this step all or substantially all of the alkali metal may be replaced by cation having desired catalytic properties, for example, cations of aluminum, iron, etc. It is preferred, however, that the alkali metal so removed be replaced by a volatile or unstable cation, for example, ammonium or an amine, which will be driven off by calcination to yield catalyst consisting of substantially pure zirconia and substantially pure alumina.

The base exchange step may be conducted on dried or undried composites in either washed or unwashed conditions. A more satisfactory operation and catalyst result, however, when the composite is dried and preferably also washed, before the base exchange step.

To effect base exchange the composite in desired condition is simply contacted with a suitable quantity of solution containing the desired cation. Thus, for example, aluminum may be substituted for the sodium content by dipping or washing a composite to suitable condition with a solution of aluminum chloride, aluminum nitrate, or aluminum sulphate. In the same manner the exchangeable alkali metal may be replaced by ammonium by use of suitable ammonium salts, for example, ammonium chloride, ammonium nitrate, ammonium sulphate, and the like.

The catalyst may vary in composition from a major proportion of zirconia and a minor proportion of alumina to a major proportion of alumina and a minor proportion of zirconia, for example, the alumina content of calcined composites consisting of alumina and zirconia may range from 15% by weight to about 95% by weight. However, it is preferred to employ catalyst in which the alumina content is at least predominating.

In employing the catalyst to produce products of the gasoline type by splitting and/or cracking ordinarily liquid hydrocarbons, substantial yields of high octane gasoline are obtained at moderate and economically obtained decomposition conditions, for example, these results are obtained with cracking temperatures not substantially in excess of 900° F. as within the range of 725 to 950° F. with a preferred range of 775 to 900° F. Although high or moderately high pressures may be used, as for example, up to 200 lbs./sq. in. gauge, the desired results are usually obtained with low pressures ranging, for example, from substantially atmospheric or just enough pressure to produce flow through the plant to about 50 lbs./sq. in. gauge. The feed rates employed may be within or above the range of ¾ to 4 volumes of liquid charge per volume of catalyst per hour. Naturally, optimum conditions for each charging stock vary with the boiling range, source and other characteristics of the charge with the general tendencies toward somewhat more severe operating conditions, e. g. somewhat higher temperature, higher pressure, or lower feed rate, as the average boiling point of the stock decreases.

In use the catalyst may be contacted with the material to be converted, altered or transformed in any desired type of equipment. Thus, for example, the catalyst may be suspended in or mixed with liquid or gaseous reactants and the resulting suspension or mixture flowed through a reaction chamber maintained at desired reaction conditions, or the catalyst and reactants may be contacted by countercurrent flow through the chamber. The spent catalyst may be revivified, for example, by combustion, in separate vessels adapted as desired, for continuous flow of the catalyst therethrough, or for regeneration of stationary catalyst. Or the catalyst may be contained in tubes or in larger reaction vessels preferably adapted for use alternately on stream and in regeneration. In the interest of long catalyst life involving a large number of repeated regenerations, the catalytic converter is preferably constructed or designed to permit removal of the coky deposits rapidly and at controlled temperature, preferably not in excess of 1200° F. The intervals at which a catalyst is regenerated may vary from a few minutes to several hours depending upon a number of factors, including plant design, local plant economics, the nature of the reactions and characteristics of charging stock. In the interest of obtaining higher desired yields of desired decomposition products, such as motor and aviation gasoline, it is preferred to conduct the regenerations after comparatively short "on stream" periods, for example of 5 minutes to an hour in duration. When less persistent deposits are formed as is often the case with low temperature polymerizations, for example, of ordinarily gaseous olefins including butylenes and/or propylenes to produce gasoline or the like, longer on-stream periods may be employed, for example, several hours.

Reaction products of desired boiling range are separated from the balance of the products of operation by any suitable method. For example, in practice of the invention to produce gasoline from hydrocarbon oils heavier than gasoline, as exemplified by light and heavy gas oils and distillation residues, the desired gasoline may be separated from ordinarily gaseous reaction products and uncoverted or partially converted higher boiling hydrocarbons by fractionation and condensation. In the same manner, in improving the anti-knock rating of gasolines or light or heavy naphthas boiling within the boiling range of gasoline, the fraction of improved anti-knock rating may be separated from gaseous products and higher boiling condensation or polymerization products. In either event the separated higher boiling hydrocarbons are of the nature of clean gas oil and may be utilized as or in charging stock to a thermal or catalytic cracking operation or as distillate fuel.

To facilitate regeneration, the catalyst is preferably utilized in the form of granules or molded pieces of substantially uniform size and shape. When molded pieces are produced, any desired molding method may be employed but it is preferred to utilize methods which avoid introduction of extraneous binders. Exemplary molding operations which avoid use of additional binding agents include extrusion or pressuring of undried hydrous composite, molding mixtures of dried and undried composite as set forth in U. S. Patent 2,146,718, issued to G. R. Bond, February 14, 1939, and pressure or impact molding of dried composite as obtained in pill machines and the like.

The following examples are for purposes of illustration only:

*Example 1*

A catalyst consisting of about 85% zirconia and about 15% alumina was prepared in the following way:

Approximately 915 grams of $Zr(NO_3)_4.5H_2O$ and approximately 230 grams of $AlCl_3.6H_2O$ were dissolved in about 2800 cc. of water to which 190 cc. of concentrated hydrochloric acid had been added. To the mixed solution there was added slowly, with stirring, 1040 cc. of a solution containing about 108 grams of NaOH and 143 grams of $Na_2CO_3$. With continued stirring, 370 cc. of a solution containing 38 grams $NaHCO_3$ was added. Upon further continued stirring, a small quantity of precipitate was produced after which the entire mixture began to thicken, whereupon stirring was discontinued. In a few minutes, the entire mixture had set to a firm jelly having pH of the order of 3.0. The jelly was broken up and sufficient $Na_2CO_3$ was stirred in to raise the pH to about 5. The gel was then filtered and 80 to 85% of it was dried at temperature below 200° F., washed substantially free of salts with water, and then treated with ammonium chloride solution until substantially free of alkali metal. Excess ammonium chloride was then washed out and excess wash water was driven off by low temperature drying. The resulting granules were then ground and the powder thus produced, was formed into cylindrical pellets of about 4 mm. by 4 mm. The pellets were then calcined in a stream of air for about 2 hours at 1050° F.

The finished catalyst was then utilized to crack an East Texas gas oil of 36° A. P. I. having a boiling range of about 410° F. to 730° F. in a cyclic operation involving ten minute on-stream periods separated by regeneration periods in which accumulated coke was burned off at below 1100° F. For the on-stream periods, the East Texas gas oil was vaporized and fed at substantially atmospheric pressure and at a rate of about 1½ volumes of liquid gas oil to one volume of catalyst through a bed of the substantially pure zirconia-alumina pellets maintained at about 800° F. The yields of 410° F. E. P. gasoline obtained were about 30% of volume of the fresh charge. Simultaneously produced were 2.4 to 2.8% by weight of coke and an average of about 5.5% by weight of a rich gas having a high content of unsaturates. The octane rating of the gasoline was above 70 C. F. R. motor method.

*Example 2*

Another catalyst consisting of substantially pure zirconia and substantially pure alumina and having practically the same composition as that illustrated in Example 1, was prepared by mixing separately produced hydrous oxides of zirconia and alumina. To manufacture this catalyst, the following procedure was employed:

About 1180 grams of $Zr(NO_3)_4.5H_2O$ and about 245 cc. of concentrated hydrochloric acid were added to 3400 cc. of water. The resulting solution was mixed with about 2440 cc. of a solution of 293 grams of NaOH and about 189 grams of $Na_2CO_3.10H_2O$. A solution of $AlCl_3.6H_2O$ was prepared by dissolving approximately 295 grams of this salt in 700 cc. of water. A third solution was prepared by dissolving about 805 grams of $Na_2CO_3.10H_2O$ in approximately 6250 cc. of water. Sufficient quantity of this last named solution was added to the solution containing zirconium salt to produce a hydrosol of zirconia having pH of about 5 which set in a short time to a gel. The balance of the sodium carbonate solution was mixed with the solution of the aluminum salt to produce gelatinous hydrous alumina. The two materials were milled together for about an hour in a ball mill producing a slurry which was filtered and dried at 160 to 180° F. for about 12 hours. The dried composite was then water washed substantially free of soluble salts and thereafter subjected to treatment with ammonium chloride solution until substantially free of alkali metal. After again being washed, the purified composite was dried, ground and molded into pellets which were calcined for about two hours at temperature of the order of 1050° F. When used to crack the same charging stock utilized in Example 1, under substantially the same conditions there employed, a 410° F. E. P. gasoline of above 70 octane rating amounting to about 30% of volume of fresh charge, was produced.

*Example 3*

Another composite of substantially pure zirconia and substantially pure alumina of practically the composition of the catalyst prepared as illustrated in Examples 1 and 2, was made from solutions which were free from alkali metal. The hydrous composite of zirconia and alumina was prepared by dissolving about 228 grams of $AlCl_3.6H_2O$ and approximately 365 grams of $Zr(NO_3)_4.5H_2O$ in about 7530 cc. of water and adding to the resulting mixed solutions, slowly and with continuous stirring, about 620 grams of concentrated $NH_4OH$ which had been diluted with water to a volume of approximately 1380 cc. A co-gelatinous product was produced which was probably a mixture of precipitate and hydrogel having pH of about 4.7. It was dried, washed substantially free of chlorides, reduced to powder by grinding and then molded. The molded pieces, after calcination for about 2 hours at about 1050° F., were utilized to promote transformation of the same charge employed in the previous examples under substantially the same operating conditions. The cracking operation produced somewhat more than 20% of volume of 410° F. E. P. gasoline having octane of above 70, CFR motor method together with 2% by weight of coke and approximately 2.5% of weight of heavy, rich gas.

*Example 4*

A catalyst consisting of about 88% substantially pure alumina and of the order of 12% substantially pure zirconia was produced as follows:

About 4210 grams of $Al_2(SO_4)_3.18H_2O$, 328 grams of $Zr(NO_3)_4.5H_2O$, and 400 cc. of concentrated hydrochloric acid were dissolved in 8000 cc. of water. A second solution was prepared by dissolving about 845 grams of NaOH and about 3010 grams $Na_2CO_3.10H_2O$ in 4700 cc. of water. With continuous stirring, the second solution was slowly added to the first whereupon there was produced a thick mixture of precipitate and gel of about pH 7.3. This mixture was dried, washed substantially free of soluble salts, treated with ammonium chloride solution until substantially free of sodium, again washed, dried, ground, and molded into small cylindrical pellets. The latter were calcined for about 2 hours at 1050° F. Upon utilization of these pellets under the same conditions as employed in the previous examples to crack the same charging stock, there was produced about 32.5% by volume of the charge of the 410° F. E. P. gasoline of better than 70 octane CFR motor method.

I claim as my invention:

1. A process for promoting reactions which involve splitting of carbon-to-carbon bonds in ordinarily liquid hydrocarbons comprising contacting said hydrocarbons under splitting conditions with a catalyst consisting essentially of zirconia and alumina produced by calcining hydrous alumina and hydrous zirconia prepared and composited by coprecipitation in aqueous menstruum at controlled pH within the range of 3 to 8.

2. A process for producing gasoline from hydrocarbons heavier than said gasoline comprising cracking said hydrocarbons in the presence of a catalyst consisting essentially of intimately associated zirconia and alumina prepared by separate formation of hydrous zirconia and hydrous alumina in aqueous menstruum, compositing said hydrous oxides in the gelatinous state of each, and calcining the resulting hydrous composite.

3. A process for producing gasoline from hydrocarbons heavier than said gasoline comprising cracking said hydrocarbons in the presence of a catalyst consisting essentially of intimately associated zirconia and alumina prepared by interaction of solutions yielding composited hydrous zirconia and hydrous alumina and calcination of the resulting composite.

4. A process for producing gasoline from hydrocarbons heavier than said gasoline comprising cracking said hydrocarbons in the presence of a calcined catalyst consisting essentially of substantially pure zirconia and alumina composited as the nucleus of a base exchange body.

5. A process for producing gasoline from hydrocarbons heavier than said gasoline comprising cracking said hydrocarbons in the presence of a catalyst consisting essentially of zirconia and alumina prepared by compositing hydrous zirconia and hydrous alumina in the presence of alkali metal to produce a base exchange body, freeing said body of alkali metal, and calcining the alkali metal free product.

6. A process for producing gasoline from hydrocarbons heavier than said gasoline comprising cracking said hydrocarbons in the presence of a catalyst consisting essentially of intimately associated zirconia and alumina obtained by reaction of solution which yield hydrous zirconia, hydrous alumina and water soluble reaction products, said catalyst being prepared by compositing the hydrous oxides in the presence of said soluble reaction products, drying the composite, washing out said soluble reaction products, and calcining the dried and washed composite.

7. A process for producing gasoline from hydrocarbons heavier than said gasoline comprising cracking said hydrocarbons in the presence of a catalyst consisting essentially of intimately associate zirconia and alumina prepared by interacting solutions of a zirconium salt, an aluminum salt and an alakline compound containing alkali metal to produce a base exchange body, displacing alkali metal from said body with ammonium cation, and calcining the ammonium containing product.

JOHN R. BATES.